United States Patent
Brückner et al.

(10) Patent No.: US 7,146,847 B2
(45) Date of Patent: Dec. 12, 2006

(54) KNOCK SENSOR FOR AN INTERNAL COMBUSTION ENGINE

(75) Inventors: Lothar Brückner, Leonberg (DE); August Kästner, Welzheim (DE)

(73) Assignee: Christian Bauer GmbH + Co., Welzheim (DE)

(*) Notice: Subject to any disclaimer, the term of this patent is extended or adjusted under 35 U.S.C. 154(b) by 36 days.

(21) Appl. No.: 10/526,211

(22) PCT Filed: Jun. 7, 2003

(86) PCT No.: PCT/DE03/01895

§ 371 (c)(1),
(2), (4) Date: Mar. 3, 2005

(87) PCT Pub. No.: WO2004/025238

PCT Pub. Date: Mar. 25, 2004

(65) Prior Publication Data

US 2005/0252276 A1    Nov. 17, 2005

(30) Foreign Application Priority Data

Sep. 4, 2002    (DE) ................. 102 40 671

(51) Int. Cl.
*G01L 23/22* (2006.01)
(52) U.S. Cl. .................................... 73/35.09
(58) Field of Classification Search ............. 73/35.01, 73/35.03–35.07, 35.09–35.13, 117.2, 117.3
See application file for complete search history.

(56) References Cited

U.S. PATENT DOCUMENTS

| 4,448,059 A | 5/1984 | Kondo et al. ............ 73/35.09 |
| 4,463,610 A | 8/1984 | Anderson, III et al. ...... 73/654 |
| 5,753,798 A * | 5/1998 | Engeler et al. ............ 73/35.13 |
| 6,487,898 B1 * | 12/2002 | Haefner et al. ............ 73/115 |

FOREIGN PATENT DOCUMENTS

| DE | 37 14 195 | 11/1988 |
| DE | 40 34 019 | 7/1992 |
| DE | 195 39 919 | 5/1996 |
| DE | 198 31 372 | 1/2000 |
| DE | 199 54 164 | 6/2001 |
| EP | 0 533 709 | 12/1993 |
| EP | 0 472 219 | 12/1994 |
| EP | 0 649 008 | 6/1998 |
| EP | 0 844 470 | 2/2002 |

* cited by examiner

*Primary Examiner*—Daniel S. Larkin
*Assistant Examiner*—Tamiko Bellamy
(74) *Attorney, Agent, or Firm*—Collard & Roe, P.C.

(57) ABSTRACT

A knock sensor for an internal combustion engine with an electronically evaluated vibration sensor should have a simple design and allow a rational installation.

Figure 1:
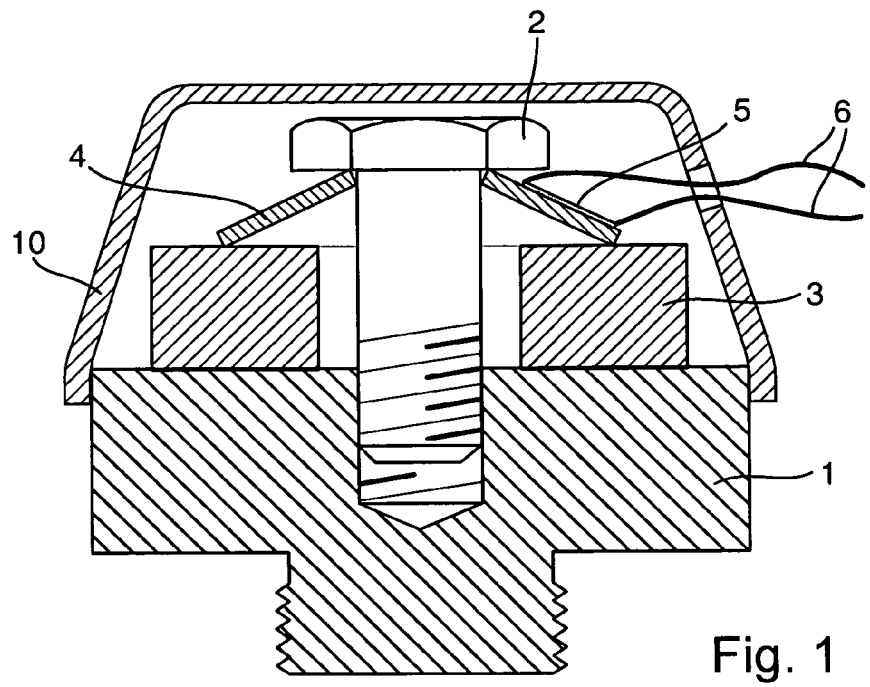

To this end, the vibration sensor is characterized in that
the knock sensor comprises at least one spring washer (4, 4') that is or can be tensioned relative to the internal combustion engine, and
a piezoresistive amorphous carbon layer (5) is applied onto at least one face of the at least one spring washer (4; 4').

6 Claims, 3 Drawing Sheets

KNOCK SENSOR FOR AN INTERNAL COMBUSTION ENGINE

CROSS REFERENCE TO RELATED APPLICATION

Applicants claim priority under 35 U.S.C. §119 of German Application No. 102 40 671.5 filed on Sep. 4, 2002. Applicants also claim priority under 35 U.S.C. §365 of PCT/DE2003/001895 filed on Jun. 7, 2003. The international application under PCT article 21(2) was not published in English.

The invention pertains to a knock sensor for an internal combustion engine with an electronically evaluated vibration sensor.

The vibration sensor of known knock sensors is realized, for example, in the form of a piezoceramic element. Knock sensors of this type are known, for example, from EP 0 47 22 19 B1, EP 0 844 470 D1 and DE 195 39 919 C2. US 4,448,059 A discloses a knock sensor for an internal combustion engine with an electronically evaluated vibration sensor in the form of a piezoresistive layer that is rigidly applied onto a surface section of a base body.

DE 199 54 164 discloses sensors for determining state variables, particularly forces exerted by mechanical components, by utilizing amorphous carbon layers with a thickness between 10 nm and 500 μm. These amorphous carbon layers may consist, in particular, of DLC (Diamond-Like Carbon) layers and have piezoresistive properties. These layers can be applied onto surfaces with different geometries. For example, these layers may be applied by means of a PVD (Physical Vapor Deposition) or CVD (Chemical Vapor Deposition) method. A sensor provided with such carbon layers can be variably utilized and easily adapted to the different requirements of certain applications. A sensor of this type also makes it possible to measure Parameters in a reliable and reproducible fashion.

In other respects, DE 19 831 372 discloses washers that are provided with measuring layers and used for controlling non-positive connections.

In a knock sensor of the initially cited type, the invention aims to achieve a simple and reliable acquisition of measuring signals, as well as an equally simple and reliable transmission thereof.

This objective is attained with a knock sensor of the initially cited type that is realized in accordance with the characteristics disclosed in the characterizing portion of claim 1.

Advantageous and practical embodiments form the objects of the dependent claims.

The invention essentially proposes to eliminate, in comparison with the current state of the art, an additional component that usually consists of the vibration sensor in a knock sensor of this type, namely by directly applying a thin measuring layer onto the surface of a component that not only fulfills the vibration sensor function.

According to the invention, the measuring layer is applied onto a tensioning element in the form of the spring washer provided in the knock sensor. The spring washer may be realized, in particular, in such a way that the seismic mass of the knock sensor that is usually braced within the knock sensor by means of a spring washer is an integral part of the spring washer.

In the piezoresistive amorphous carbon layers to be utilized in accordance with the invention, the vibrations of the internal combustion engine cause voltage changes in the layer, when said vibrations act upon the spring washer, wherein these voltage changes can be conventionally evaluated. When utilizing a spring washer according to the invention with a piezoresistive amorphous carbon layer, the deformation of the spring washer is used for generating electrical measurable voltage changes in the layer.

The high measuring sensitivity of the measuring layer according to the invention is particularly well suited for a telemetric signal evaluation. With respect to the principle of telemetric signal evaluation methods to be considered for this purpose, we refer to the state of the art, for example, according to DE 40 34 019 C1, EP 0 533 709 B1 and DE 37 14 195 A1.

Advantageous and practical embodiments of the invention are illustrated in the figures.

Figure 2:
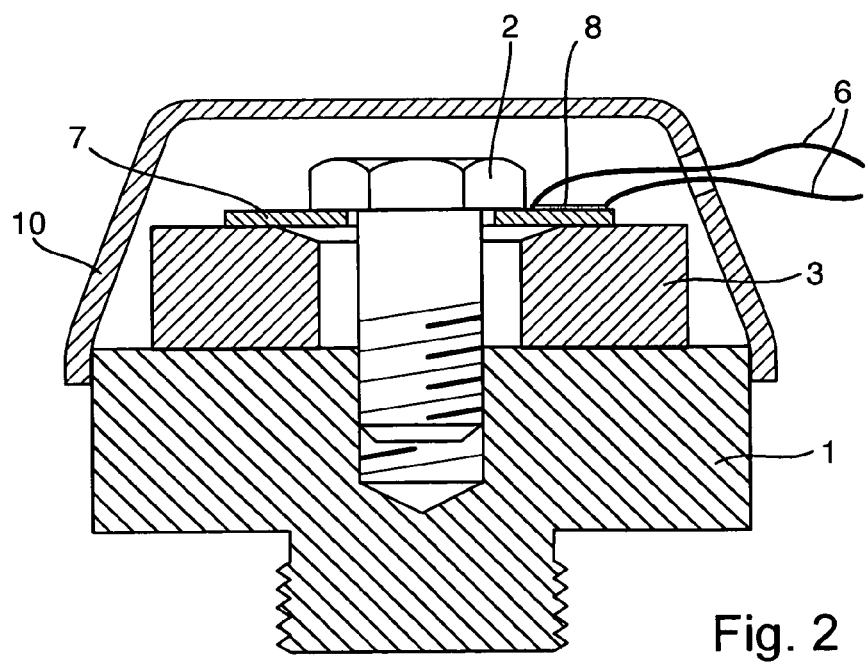
Figure 3:
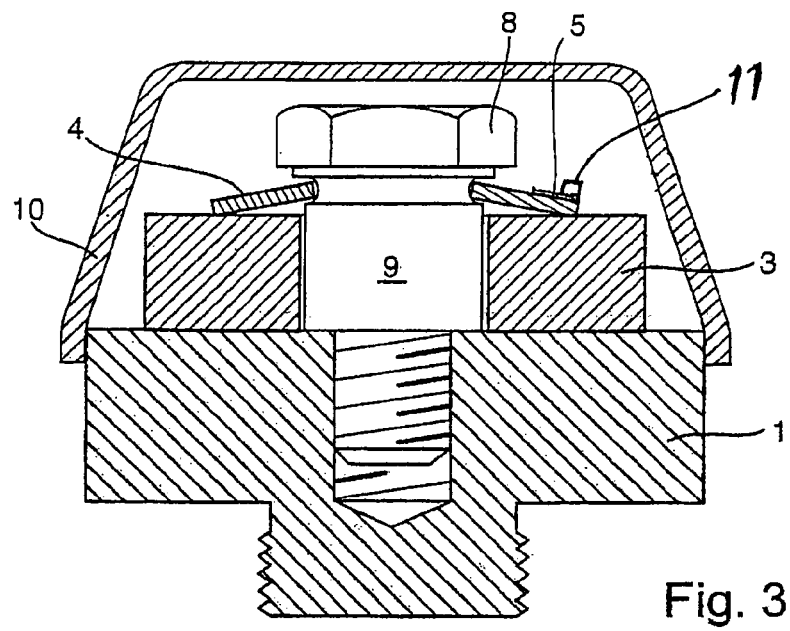
Figure 4:
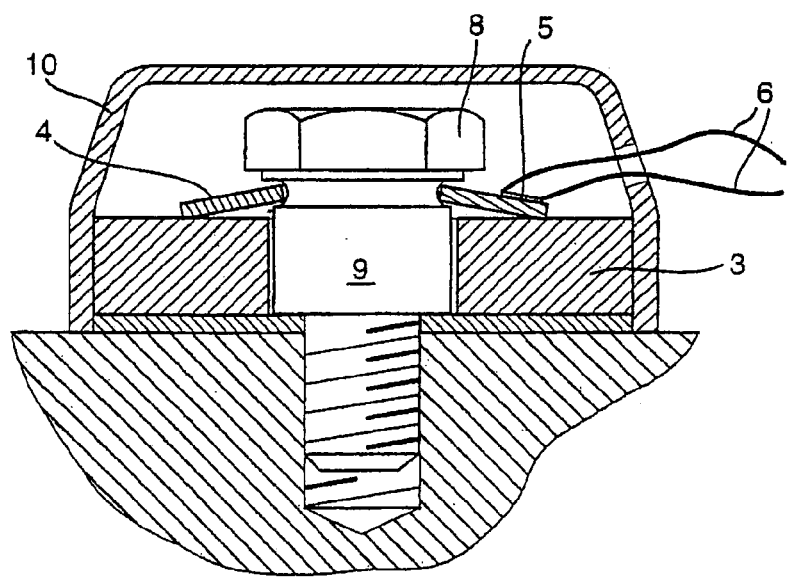
Figure 5:
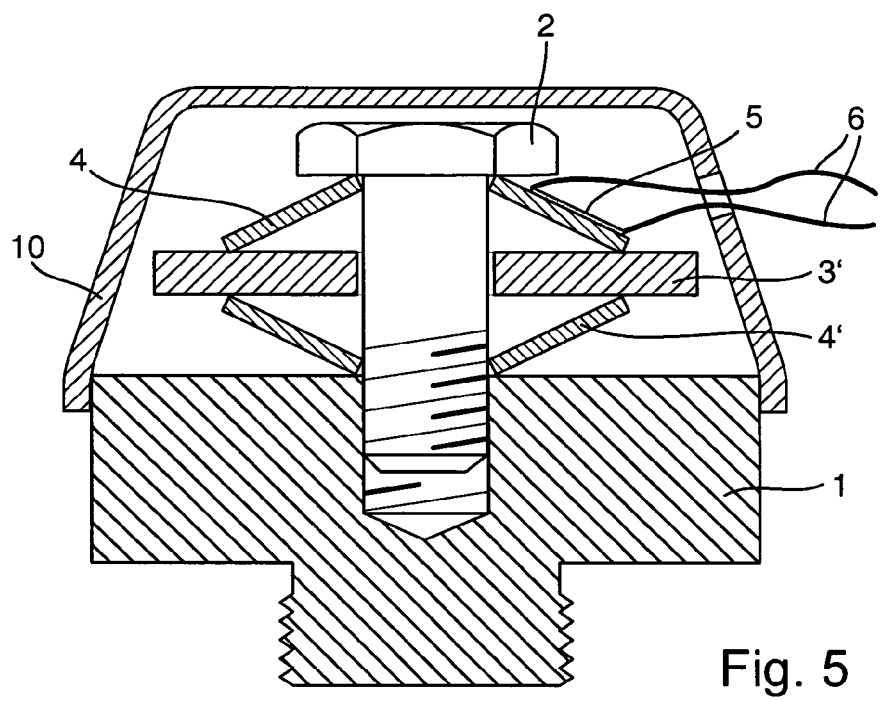

The figures respectively show in the form of a longitudinal section:

FIG. 1, a first embodiment of a knock sensor with a spring washer arranged between a seismic mass and an abutment that can be rigidly mounted on an internal combustion engine;

FIG. 2, a knock sensor according to FIG. 1 with a washer or spring washer in the planar state according to FIG. 1;

FIG. 3, a knock sensor according to FIG. 1 with a spring washer that is tensioned to a defined value by means of a special screw;

FIG. 4, a knock sensor with a spring washer and a special screw that serves for tensioning the spring washer and can be directly screwed to the internal combustion engine, and FIG. 5, a knock sensor with a seismic mass clamped between two spring washers.

The knock sensor according to FIG. 1 comprises a mounting body 1 for being rigidly screwed to the casing of an internal combustion engine and a screw 2 that is anchored in the mounting body 1. The head of this screw clamps a seismic mass 3 against the mounting body 1 via a spring washer 4 arranged in between.

The face of the spring washer 4 that points to the head of the screw 2 is sectionally provided with a piezoresistive amorphous carbon layer in the form of a DLC layer. Electric lines 6 lead from this layer to an electronic evaluation unit that is not shown in the figures. The thickness of the layer preferably lies in the range between 1 and 10 μm.

If knocking of the internal combustion engine occurs, the seismic mass 3 realized in the form of an annular part is acted upon by the spring washer 4 and thusly stimulated. This causes the seismic mass to exert a corresponding load upon the spring washer 4 such that a corresponding voltage change occurs in the DLC layer 5 applied onto the spring washer 4. This voltage change is transmitted to an evaluation electronic via the electric lines 6 and evaluated therein. In order to realize a telemetric transmission, the measuring signals originating from the layer 5 can be transmitted by means of a telemetric signal tap, or a transponder 11 that is arranged on the component in question together with the DLC layer 5. Conventional transmission cables and their connecting means can be eliminated by utilizing this customary transmission principle.

In the embodiment according to FIG. 2, the spring washer used consists of a washer 7 that is practically realized in the form of a flatly clamped spring washer 4.

It would also be conceivable, in principle, to respectively apply a DLC layer 5 onto both sides of the spring washer 4. 7.

FIG. 3 shows a knock sensor, in which a special screw 8 is used for tensioning the spring washer 4. A stop collar 9 that is integrated into the screw 8 makes it possible to easily adjust a defined tension of the spring washer 4 with the aid of this special screw.

When utilizing such a special screw 8, a corresponding screw-on mounting body can be eliminated as shown in FIG. 4.

In the embodiment according to FIG. 5, a seismic mass 3' is clamped between two spring washers 4, 4'. If still required at all, the seismic mass can be considerably reduced in this embodiment.

All knock sensors shown are provided with a cover housing 10.

The invention claimed is:

1. A knock sensor for an internal combustion engine with an electronically evaluated vibration sensor that is realized in the form of a piezoresistive amorphous carbon layer (5; 8; 9; 10) with a thickness between 10 nm and 500 μm, wherein this layer is rigidly applied onto a surface section of a base body (1, 4, 4', 10), wherein the knock sensor comprises at least one spring washer (4, 4') that is or can be tensioned relative to the internal combustion engine, and the piezoresistive amorphous carbon layer (5) is fixed onto at least one face of the at least one spring washer (4; 4').

2. The knock sensor according to claim 1, wherein the thickness of the piezoresistive amorphous carbon layer measures preferably between 10 nm and 20 μm.

3. The knock sensor according to claim 1, wherein the knock sensor includes a seismic mass;

piezoresistive amorphous carbon layer (8; 9; 10) is arranged between the seismic mass (3, 3') and an abutment (1) or (2) that respectively is rigidly connected to the internal combustion engine.

4. The knock sensor according to claim 1, wherein at least two spring washers (4, 4') are arranged in series with or without a seismic mass (3') provided in between.

5. The knock sensor according to claim 3, wherein the seismic mass (3, 3') is integrated into at least one spring washer (4, 4').

6. The knock sensor according to claim 1, wherein said knock sensor is provided with means for a telemetric signal tap.

* * * * *